US011803925B1

(12) United States Patent
Hutchinson

(10) Patent No.: US 11,803,925 B1
(45) Date of Patent: Oct. 31, 2023

(54) SYSTEM AND METHOD FOR SELECTING A DISPUTE RESOLUTION PROCESS

(71) Applicant: Danielle Hutchinson, Victoria (AU)

(72) Inventor: Danielle Hutchinson, Victoria (AU)

(73) Assignee: Danielle Hutchinson, Victoria (AU)

( * ) Notice: Subject to any disclaimer, the term of this patent is extended or adjusted under 35 U.S.C. 154(b) by 470 days.

(21) Appl. No.: 16/850,013

(22) Filed: Apr. 16, 2020

Related U.S. Application Data

(60) Provisional application No. 62/834,484, filed on Apr. 16, 2019.

(51) Int. Cl.
| | |
|---|---|
| *G06Q 30/00* | (2023.01) |
| *G06Q 50/18* | (2012.01) |
| *G06N 20/00* | (2019.01) |
| *G06N 5/04* | (2023.01) |
| *G06N 5/02* | (2023.01) |

(52) U.S. Cl.
CPC .......... *G06Q 50/182* (2013.01); *G06N 5/027* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,926,794 | A * | 7/1999 | Fethe | G06Q 10/10 705/7.42 |
| 7,343,295 | B2 * | 3/2008 | Pomerance | G06Q 50/188 705/309 |
| 8,364,603 | B2 * | 1/2013 | Galves et al. | G06Q 10/10 705/309 |
| 9,740,987 | B2 * | 8/2017 | Dolan | G06N 20/00 |
| 10,311,529 | B1 * | 6/2019 | Noel et al. | G06Q 30/0611 |
| 10,841,178 | B2 * | 11/2020 | Gottschalk et al. | G06F 17/15 |
| 11,127,096 | B2 * | 9/2021 | Tozzi | G06Q 50/182 |
| 11,170,375 | B1 * | 11/2021 | Kramme et al. | G06N 20/00 |
| 2002/0038293 | A1 * | 3/2002 | Seiden | G07F 17/32 348/E7.082 |
| 2002/0120464 | A1 * | 8/2002 | Kirk | G06Q 50/18 705/309 |

(Continued)

FOREIGN PATENT DOCUMENTS

| | | | | |
|---|---|---|---|---|
| CN | 111950286 A | * | 11/2020 | G06Q 20/02 |
| JP | 2013196180 A | * | 9/2013 | G06Q 20/02 |

(Continued)

OTHER PUBLICATIONS

Benjamin Alarie et al. "How Artificial Intelligence Will Affect the Practice of Law." (Nov. 7, 2017). Retrieved online Dec. 20, 2022 . https://tspace.library.utoronto.ca/bitstream/1807/88092/1/Alarie%20Artificial%20Intelligence.pdf (Year: 2017)*

(Continued)

*Primary Examiner* — James A Reagan
(74) *Attorney, Agent, or Firm* — GRAESER ASSOCIATES INTERNATIONAL INC.; Dvorah Graeser

(57) ABSTRACT

A system and method for procedure selection for dispute resolution according to a plurality of factors, wherein the factors include but are not limited to characteristics of the people (or parties) involved, the nature of the dispute and its context, and the goals of the parties involved. Optionally the characteristics of the parties are determined according to their goals.

11 Claims, 12 Drawing Sheets

(56) References Cited

U.S. PATENT DOCUMENTS

| | | | | |
|---|---|---|---|---|
| 2003/0014265 | A1* | 1/2003 | Landry et al. | G06Q 10/10 705/309 |
| 2003/0236679 | A1* | 12/2003 | Galves et al. | G06Q 50/182 705/309 |
| 2004/0186738 | A1* | 9/2004 | Reisman | G06Q 30/0601 705/26.1 |
| 2006/0031177 | A1* | 2/2006 | Rule | G06Q 50/182 705/309 |
| 2006/0089837 | A1* | 4/2006 | Adar et al. | G06Q 50/182 705/305 |
| 2006/0176365 | A1* | 8/2006 | Reisch et al. | H04L 12/1822 348/14.09 |
| 2008/0010081 | A1* | 1/2008 | Christopher | G06Q 10/00 705/309 |
| 2008/0059351 | A1* | 3/2008 | Richey et al. | G06Q 20/20 705/35 |
| 2008/0082341 | A1* | 4/2008 | Blair | G10L 15/08 704/275 |
| 2010/0131328 | A1* | 5/2010 | DeLugas et al. | G06Q 50/188 705/40 |
| 2012/0198357 | A1* | 8/2012 | Tozzi | G06Q 50/182 715/753 |
| 2012/0303559 | A1* | 11/2012 | Dolan | G06N 20/00 706/12 |
| 2013/0198090 | A1* | 8/2013 | Singh | G06Q 10/10 705/309 |
| 2013/0339256 | A1* | 12/2013 | Shroff | H04L 65/403 705/309 |
| 2015/0220854 | A1* | 8/2015 | Dolan | G06N 20/00 706/11 |
| 2016/0155161 | A1* | 6/2016 | Reisman | G06Q 30/0601 705/26.1 |
| 2016/0203571 | A1* | 7/2016 | Beshah | G06Q 50/182 705/309 |
| 2016/0300214 | A1* | 10/2016 | Chaffin et al. | G06Q 20/02 |
| 2017/0228655 | A1* | 8/2017 | Alarie et al. | G06Q 10/10 |
| 2017/0372233 | A1* | 12/2017 | Dolan | G06N 20/00 |
| 2019/0139153 | A1* | 5/2019 | Grant | G06N 5/022 |
| 2020/0020061 | A1* | 1/2020 | Sunder et al. | G06N 3/006 |
| 2020/0034842 | A1* | 1/2020 | Ponniah et al. | G06Q 40/025 |
| 2020/0169477 | A1* | 5/2020 | Gottschalk et al. | G06F 16/1805 |
| 2020/0175627 | A1* | 6/2020 | Frankel et al. | G06Q 20/405 |
| 2020/0218940 | A1* | 7/2020 | Anglin et al. | G06N 20/00 |
| 2020/0286616 | A1* | 9/2020 | Dunn et al. | G06N 3/08 |
| 2020/0372593 | A1* | 11/2020 | Tozzi | G06Q 50/182 |
| 2021/0271681 | A1* | 9/2021 | Jayaram et al. | G06Q 20/027 |
| 2021/0350481 | A1* | 11/2021 | Waslander et al. | G06Q 10/06313 |

FOREIGN PATENT DOCUMENTS

| | | | | |
|---|---|---|---|---|
| MY | | 187902 A * | 10/2021 | G06Q 10/105 |
| WO | 2016003934 | A1* | 1/2016 | G06Q 10/10 |

OTHER PUBLICATIONS

Davide Carneiro et al. "Online dispute resolution: an artificial intelligence perspective." (Jan. 3, 2012). Retrieved online Jun. 9, 2022. https://link.springer.com/content/pdf/10.1007/s10462-011-9305-z.pdf (Year: 2012)*

NYSBA. "New York Dispute Resolution Lawyer." (2018). Retrieved online Jun. 9, 2022. (Year: 2018)*

Thomas Clay. "Online arbitration." (Apr. 2019). Retrieved online Jun. 9, 2022. https://www.leclubdesjuristes.com/wp-content/uploads/2019/04/Online-Arbitration.pdf (Year: 2019)*

* cited by examiner

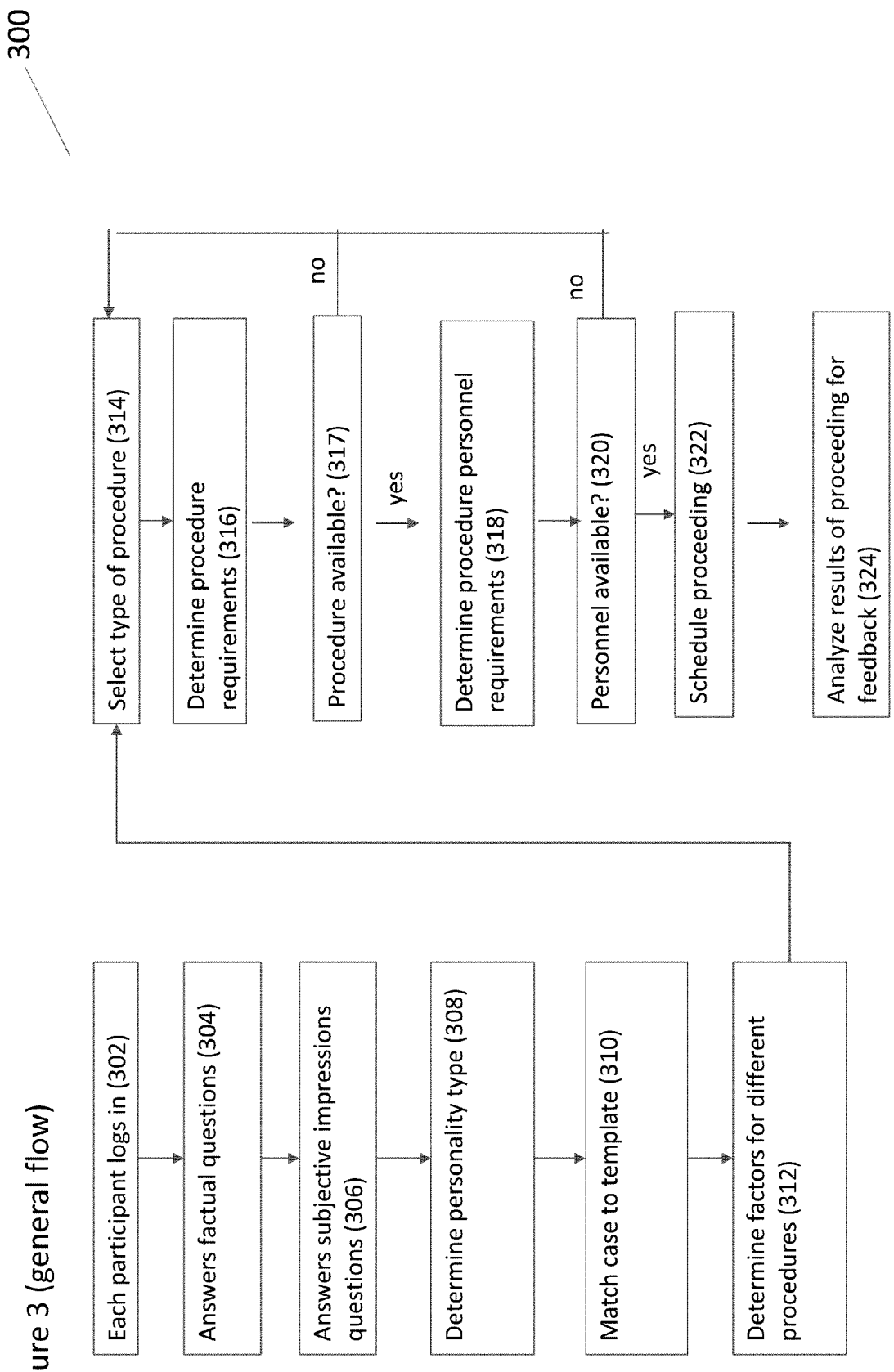

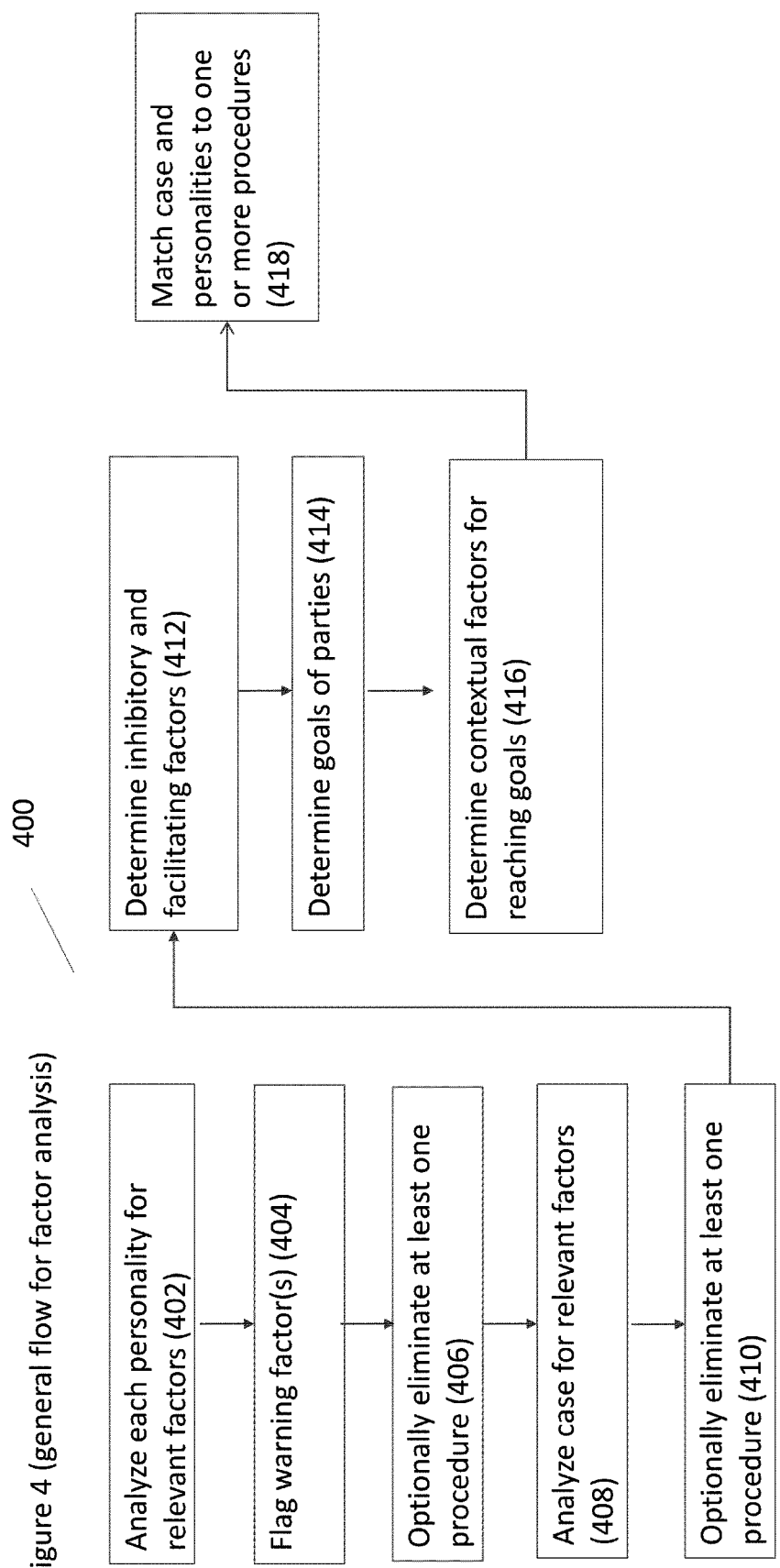
Figure 4 (general flow for factor analysis)

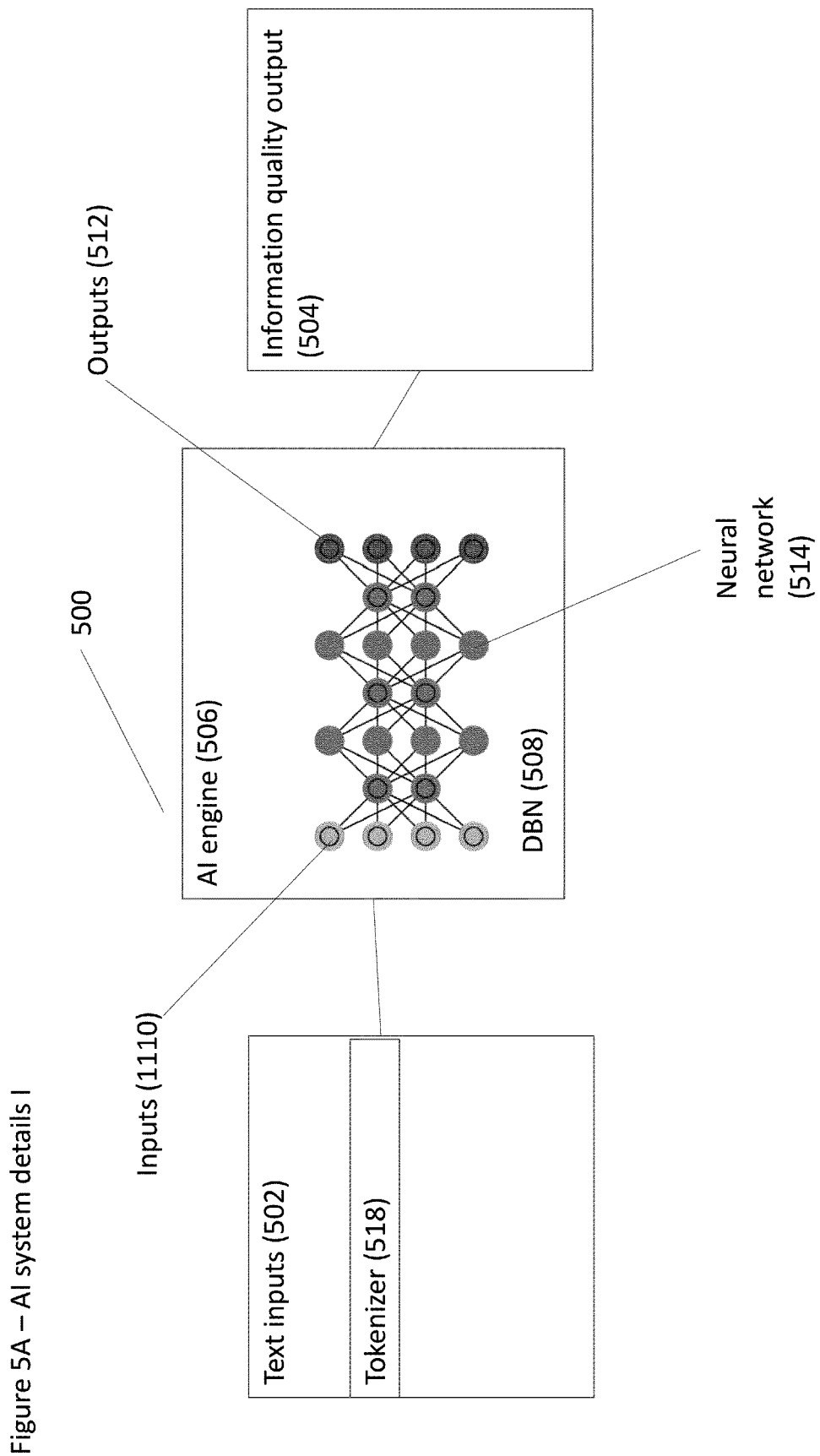
Figure 5A – AI system details I

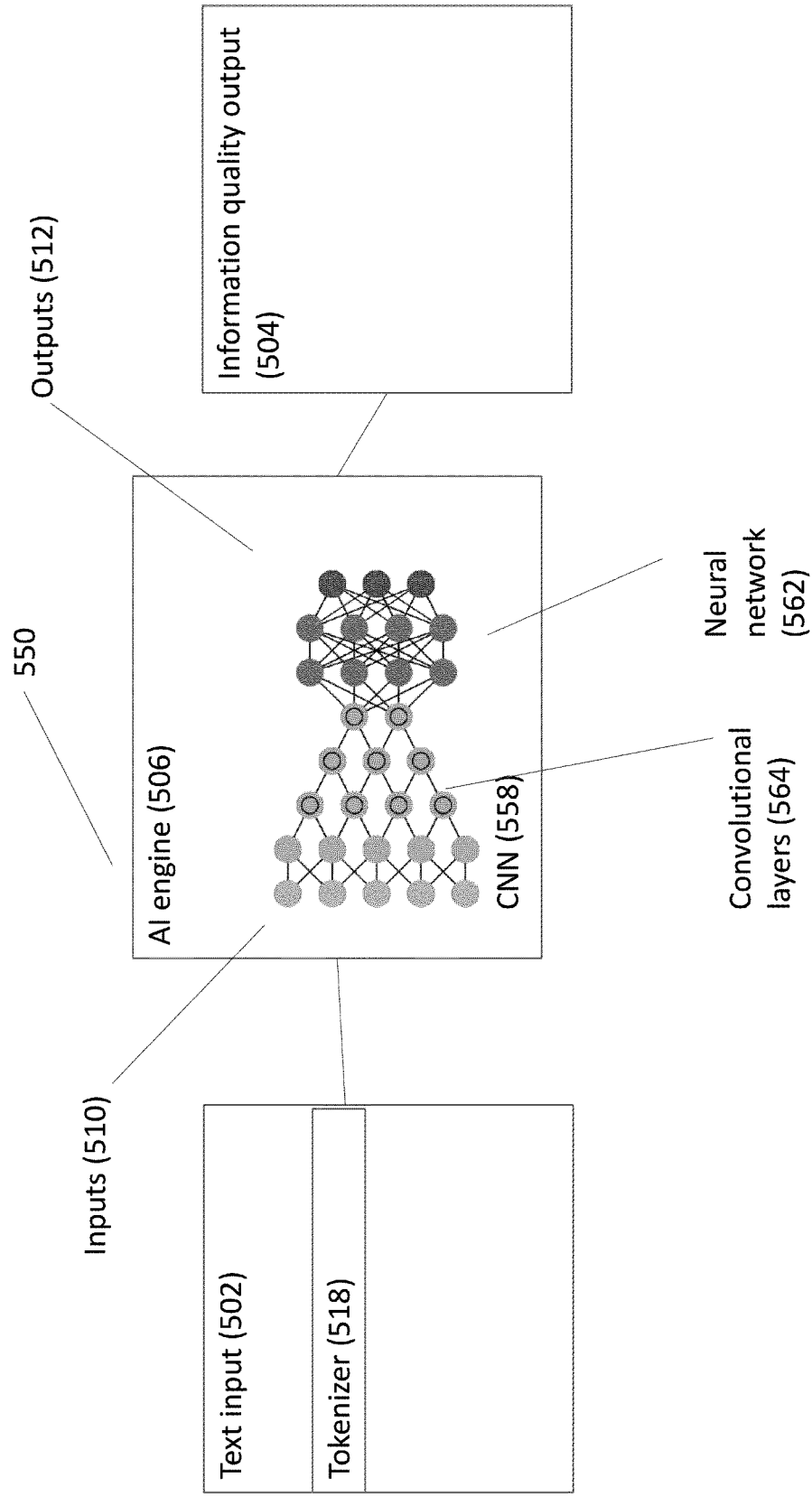
Figure 5B – AI system details II

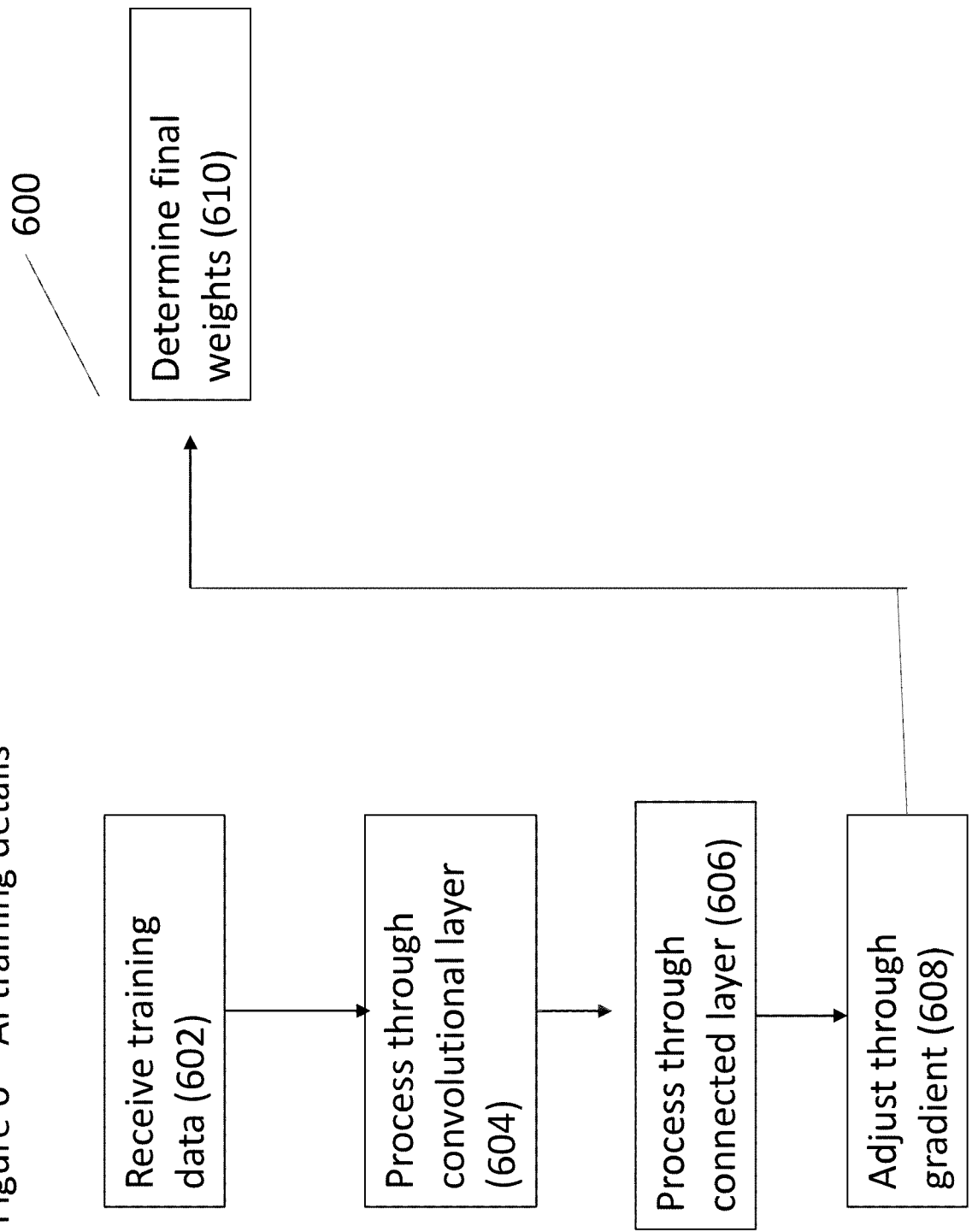
Figure 6 – AI training details

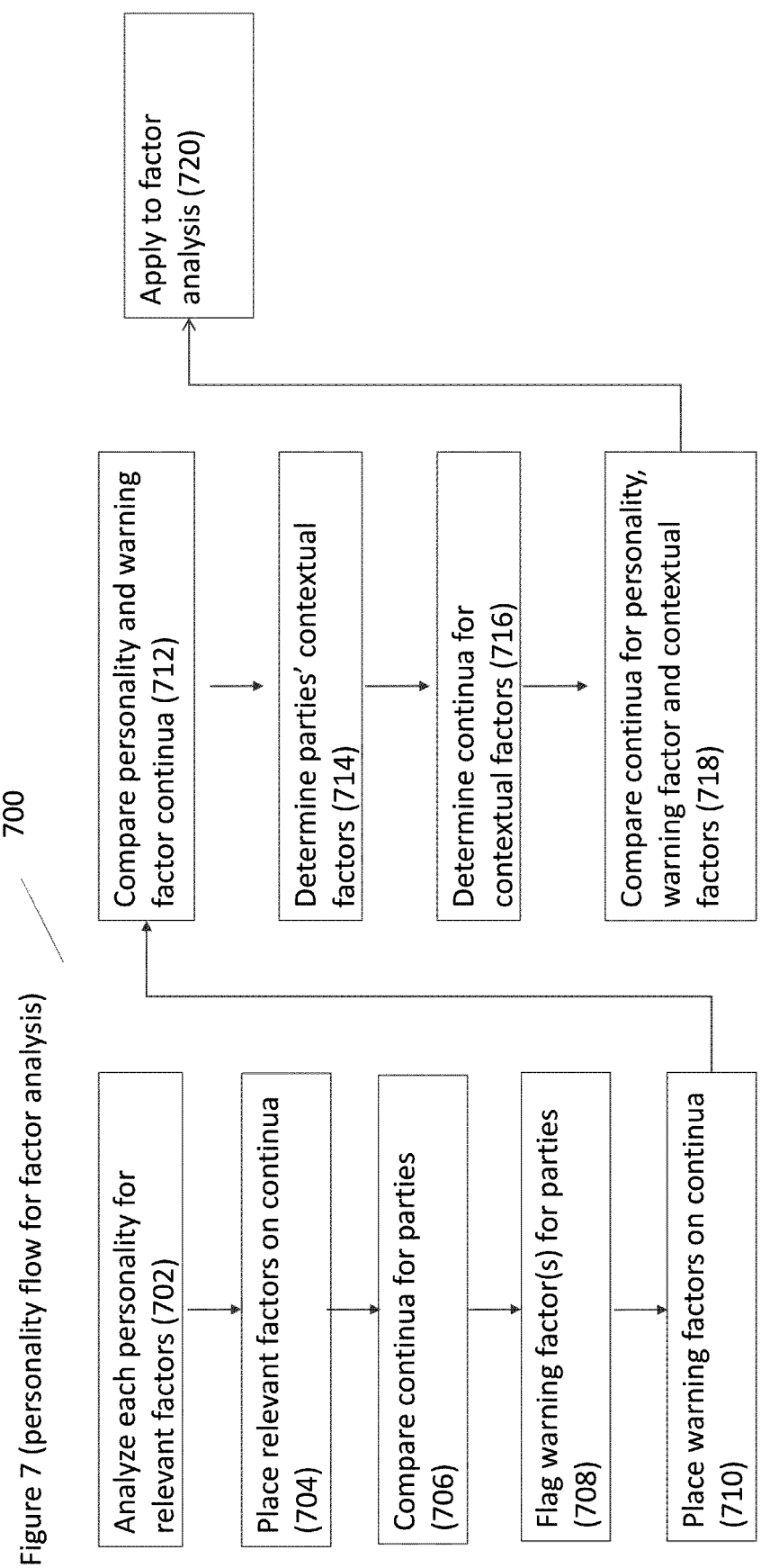
Figure 7 (personality flow for factor analysis)

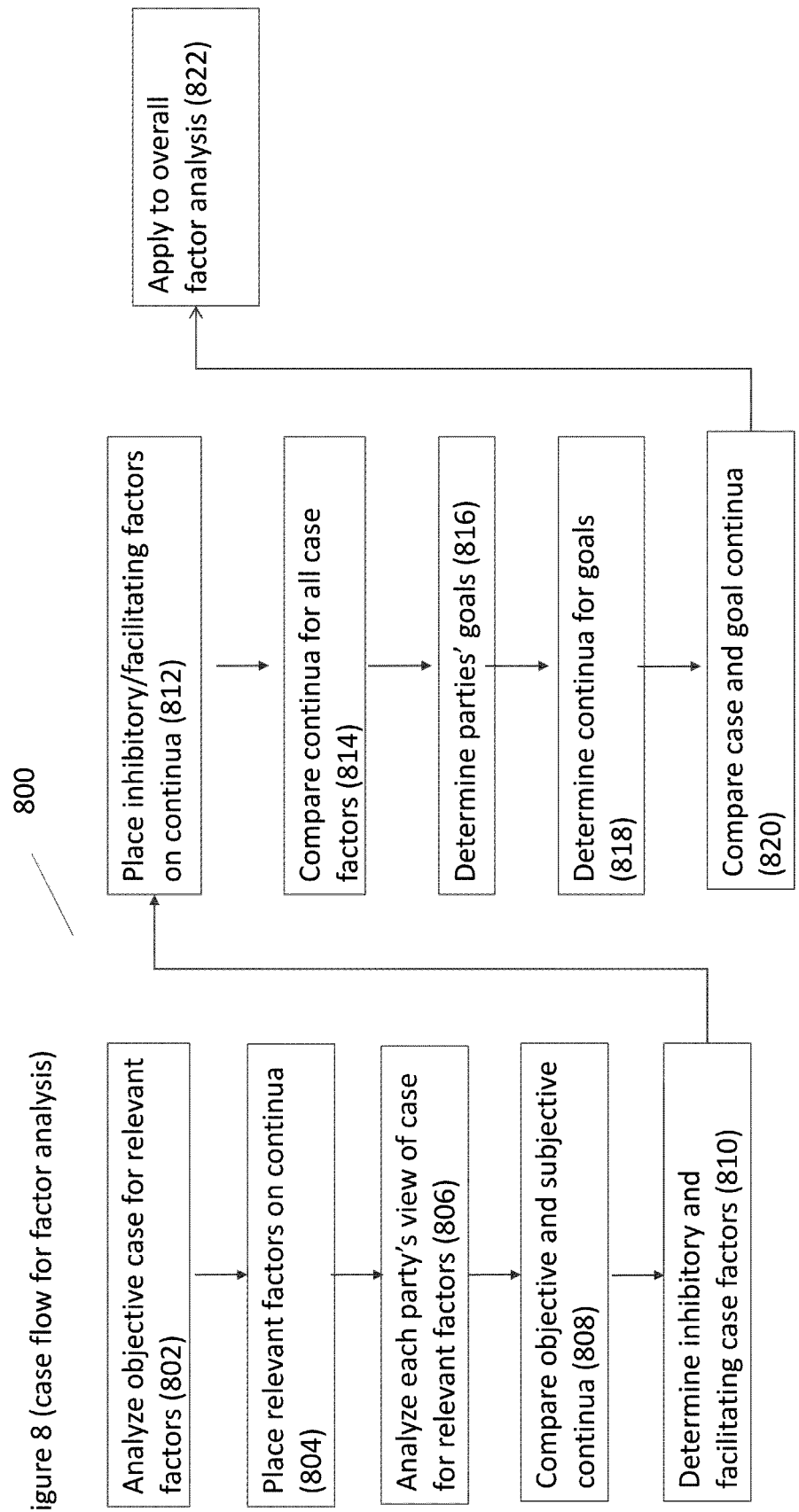

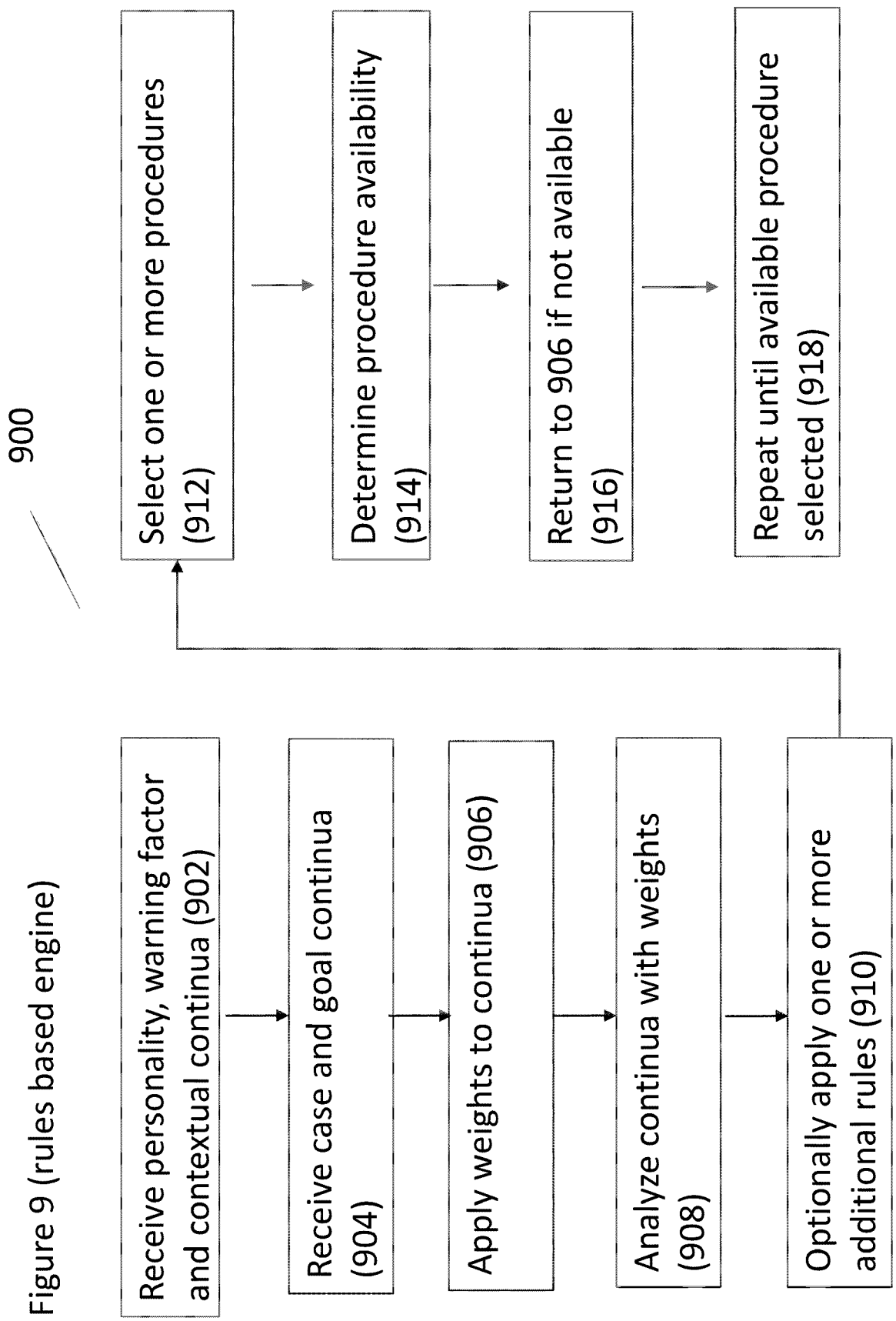
Figure 9 (rules based engine)

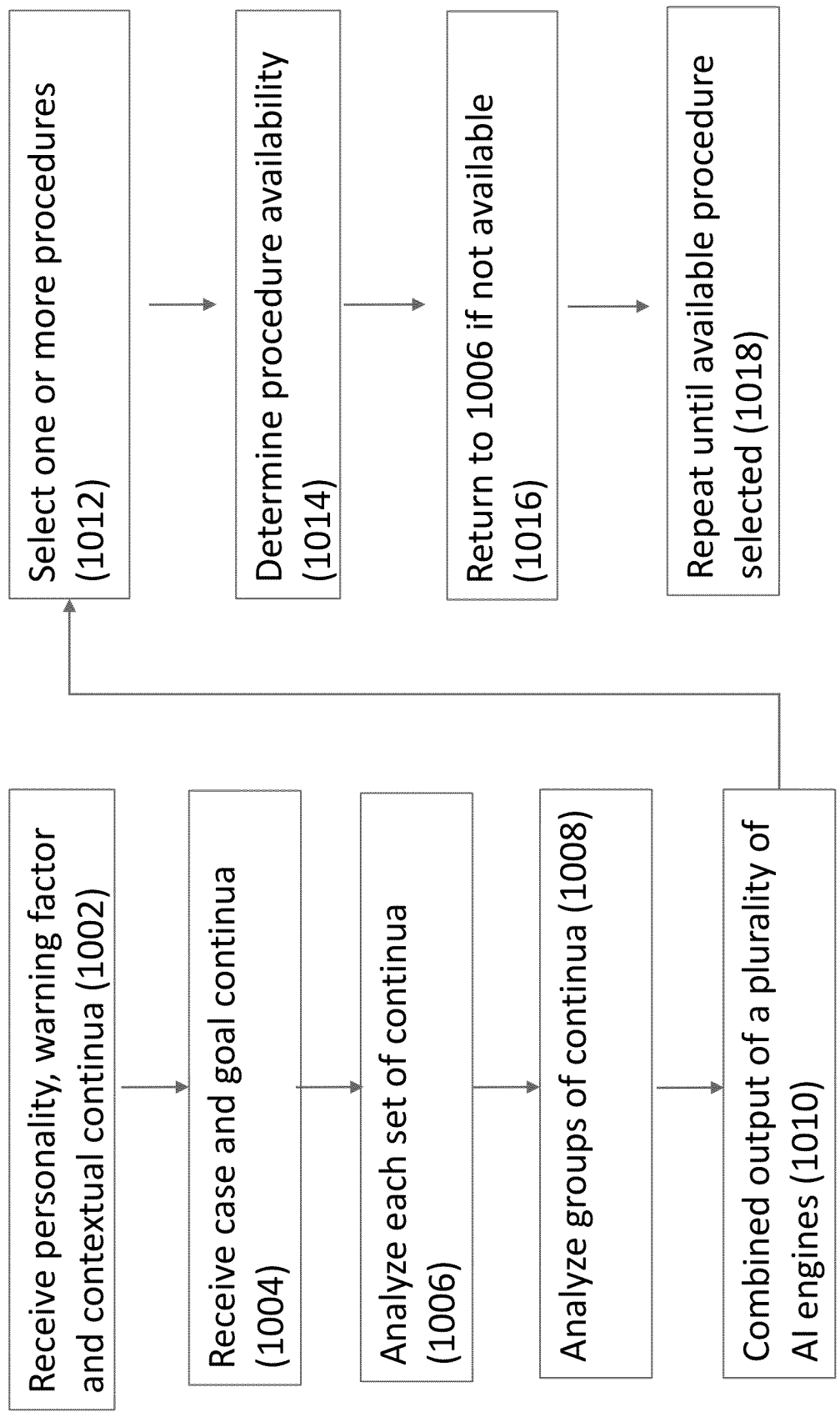
Figure 10 (AI engine)

SYSTEM AND METHOD FOR SELECTING A DISPUTE RESOLUTION PROCESS

FIELD OF THE INVENTION

The present invention relates to a system and method for procedure selection for dispute resolution, and in particular, to such a system and method in which the procedure is selected at least according to the goals of the parties and the characteristics of the dispute.

BACKGROUND OF THE INVENTION

There are many forms of dispute resolution. The key distinction between them is the extent to which the parties or a third party has control over the process and/or the outcome. Negotiation is the process during which the parties have the most control as there is potentially no third party neutral involved. On the other hand, in litigation the judge has control over the process and the outcome-in fact the outcome may be something that neither party wants. Typically, the third party becomes more involved because there is an inability for the parties to agree. The more hostile the dispute the more likely the parties are to want to hand control over to a third party neutral. This often results in the process becoming increasingly adversarial.

It can be difficult to select the correct process for dispute resolution, particularly given limited resources, including financial and time resources. Selecting the wrong process, or the wrong facilitator for the process, may lead to failure of the process. Such failure may lead to unnecessary frustration and often disproportionate business and personal costs. This wasted time, money and energy invariably leads to a further reduction in the resources available to the parties to resolve the dispute.

BRIEF SUMMARY OF THE INVENTION

The present invention, in at least some embodiments, relates to a system and method for procedure selection for dispute resolution according to a plurality of factors, wherein the factors include but are not limited to characteristics of the people (or parties) involved, the nature of the dispute and its context, and the goals of the parties involved. Optionally the characteristics of the parties are determined according to their goals.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions - which can be a set of instructions, an application, software - which are operable on a computational device (e.g., a processor) to cause the computational device to conduct and/or achieve one or more specific functionality. Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 3 shows a non-limiting, exemplary flow for performing procedure selection analysis and selecting a procedure accordingly;

FIG. 4 shows a non-limiting, exemplary process for procedure selection analysis according to at least some embodiments;

FIGS. 5A and 5B relate to non-limiting, exemplary implementations of neural net models for assessing the procedure selection factors according to at least some embodiments;

FIG. 6 relates to a non-limiting, exemplary method for training a neural net or machine learning algorithm for selecting a dispute resolution process according to a plurality of factors;

FIG. 7 shows a non-limiting, exemplary method for analyzing personal factors of the involved parties for assisting the selection of a dispute resolution process according to a plurality of factors;

FIG. 8 shows a non-limiting, exemplary method for analyzing case related factors of the involved parties for assisting the selection of a dispute resolution process according to a plurality of factors;

FIG. 9 shows a non-limiting, exemplary method for selecting a dispute resolution process according to a plurality of factors, through a rules based engine; and FIG. 10 shows a non-limiting, exemplary method for selecting a dispute resolution process according to a plurality of factors, through an AI based engine.

DESCRIPTION OF AT LEAST SOME EMBODIMENTS

The present invention, in at least some embodiments, relates to a system and method for procedure selection for dispute resolution according to a plurality of factors, wherein the factors include but are not limited to characteristics of the people (or parties) involved, the nature of the dispute and its context, and the goals of the parties involved. Optionally the characteristics of the parties are determined according to their goals.

The term "party" or "parties" refers to the individuals or groups of individuals involved. In the case of a commercial dispute, each "party" may be a company or other type of organization; in that case, the term "party" may refer to the individual(s) at the company who participate in, or have decision making power for or control over the process.

The dispute may be any type of disagreement or situation that involves parties having different opinions, and/or a situation which requires a single outcome, resolution or set of actions.

There are many forms of dispute resolution. The key distinction between them is the extent to which the parties or a third party has control over the process and/or the outcome. Negotiation is the process during which the parties have the most control as there is potentially no third party neutral involved. A neutral third party, such as a mediator, is involved in negotiated processes such as mediation.

Figure 1A:
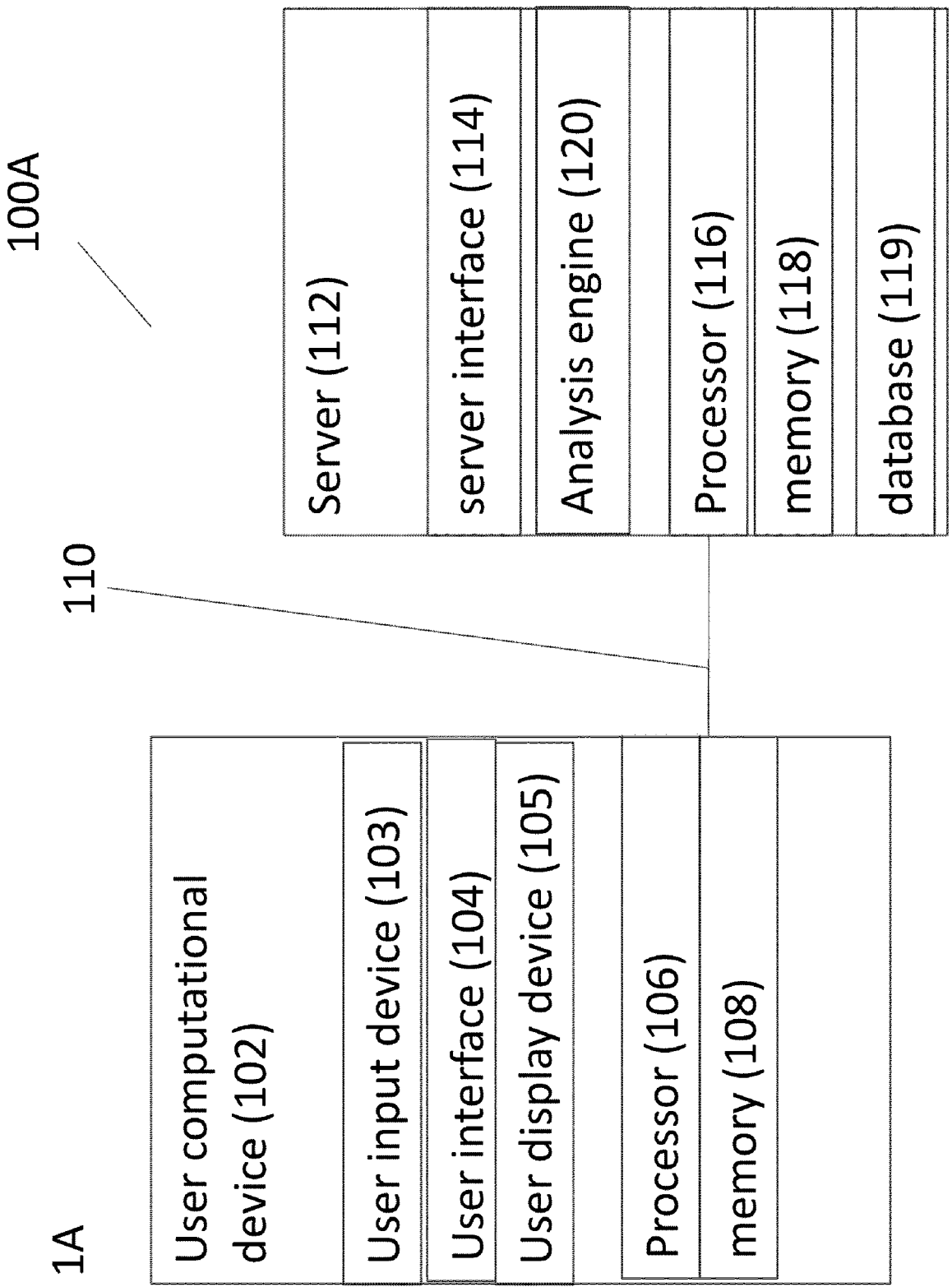
FIGS. 1A and 1B show non-limiting exemplary systems for determining a procedure selection according to at least some embodiments.
Figure 1B:
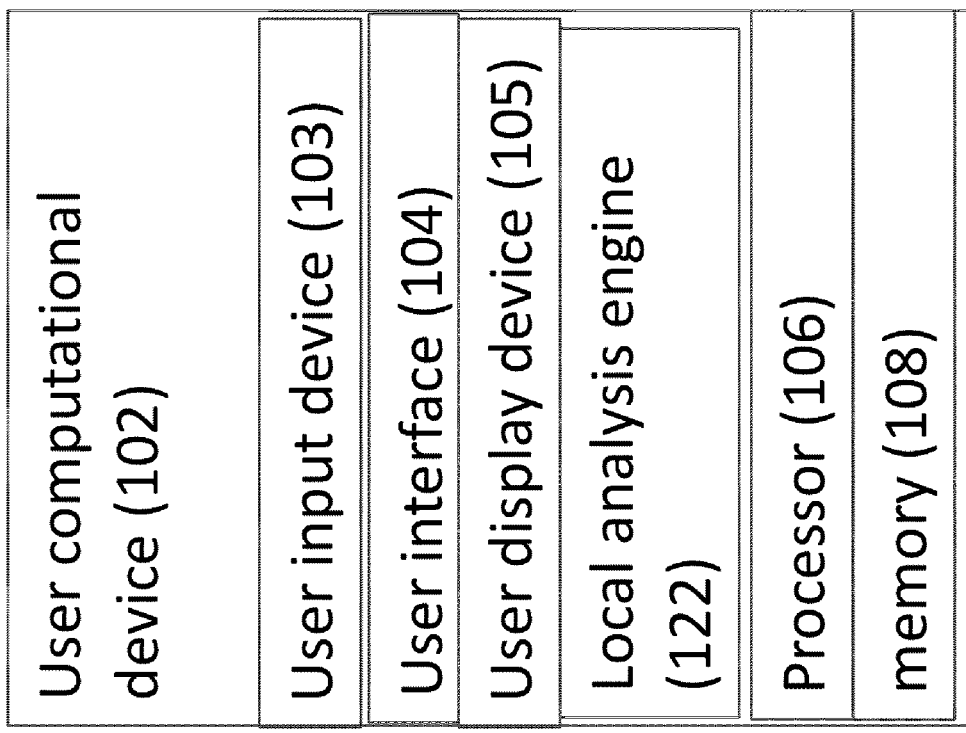

By contrast, in binding arbitration and in litigation, a neutral third party has control over the process. For example, in litigation the judge has control over the process and the outcome-in fact the outcome may be something that neither party wants. Typically, the third party becomes more involved because there is an inability for the parties to agree. The more hostile the dispute the more likely the parties are to want to hand control over to a third party neutral. This often results in the process becoming increasingly adversarial. Turning now to the drawings, FIGS. 1A and 1B show non-limiting exemplary systems for determining a procedure selection according to at least some embodiments. The procedures may include but are not limited to assisted negotiation, neutral evaluation, facilitation, arbitration, mediation, conciliation and litigation, as well as to various formal and informal formats for each of these procedures. It may also include procedures within staged or stepped dispute management systems either between or within organisations. One non-limiting example might be a dispute management system according to its organizational policies and procedures and wholly within the organization.

For the drawings as shown herein, components with the same reference numbers have the same or similar function.

FIG. 1A shows a system 100A, featuring a user computational device 102 in communication with a server 112 through a computational network 110, which may be the internet for example. Information about the parties involved in the dispute, the facts of the case and so forth may be entered through user computational device 102 and then analyzed at server 112 (optionally partial analysis is performed at user computational device 102). Server 112 then determines the factors associated with applying one or more procedures to the case, and provides the procedure selection assessment as an output. Non-limiting examples of factors to consider for determining which procedure is most likely to succeed include the level of dispute-savviness of the parties, that is, their level of knowledge, skill and attitudes towards dispute resolution; the personalities of the parties, including any characteristics that are likely to promote or retard a settlement being reached; the facts of the case; the amount of time elapsed since the dispute arose, as certain procedures may be more successful within a certain window of elapsed time; the goals of the parties; and the availability of personnel and facilities needed to implement each procedure.

Non-limiting examples of factors that are likely to promote or retard any type of negotiated settlement include whether the parties are subject to pressure from constituents, the number of issues in dispute, any experience of the parties in negotiation, and the personality of the parties in relation to the goals of the parties.

The user computational device 102 may optionally be any type of suitable computational device, including but not limited to a laptop, a desktop, a smartphone, a cellular telephone, a mobile device, and the like. The server 112 may optionally be any type of suitable server or a plurality of servers, including without limitation a collection of microservices, a virtual machine, or a plurality of hardware and/or virtual machines.

The user computational device 102 features a user input device 103 and a user interface 104. The user input device 103 may optionally include any type of suitable input device hardware, including but not limited to a keyboard, a pointing device such as a mouse or other types of pointing device, or a touch screen, or a combination thereof.

For example, the user interface 104 may include a graphical user interface (GUI) or an interface to input computer-executable instructions that direct the processor to carry out specific functions. The user interface 104 employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

The user interface 104 may optionally also be displayed through a user display device 105 and preferably includes the software needed to support receiving user instructions, displaying information to the user, querying the user, and so forth.

Preferably, the software of the user computational device 102 is stored, for example, on a memory 108 and is then operated by a processor 106. Any method as described herein may be implemented as a plurality of instructions being executed by a processor; for user computational device 102, such instructions would be stored in memory 108 and executed by processor 106.

As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 108 is configured for storing a defined native instruction set of codes. Processor 106 is configured to perform a defined set of basic operations in response to receiving a corresponding basic instruction selected from the defined native instruction set of codes stored in memory 108. For example and without limitation, memory 108 may store a first set of machine codes selected from the native instruction set for receiving information from the user through user interface 104 and a second set of machine codes selected from the native instruction set for transmitting such information to server 112 as information about the dispute and/or about the parties, including without limitation one or more personality factors and/or contextual (environmental) factors about the parties, one or more objective factors about the dispute and/or one or more subjective factors about the dispute as viewed by one or more parties.

Instructions from the user computational device 102 are sent to the server 112 through the computer network 110. The server 112 features a server interface 114, a processor 116, a memory 118, a database 119, an analysis engine 120, and/or other components. The previously described analysis and procedure selection assessment is preferably performed by analysis engine 120. The server 112 may include a plurality of hardware, software, and/or firmware components operating together to provide the functionality attributed herein to server 112.

The memory 118 may comprise non-transitory storage media that electronically stores information. The memory 118 may include one or both of system storage that is provided integrally (i.e., substantially non-removable) with a respective component of system 100A and/or removable storage that is removably connected to a respective component of system 100A via, for example, a port (e.g., a USB port, a firmware part, etc.) or a drive (e.g., a disk drive, etc.). The memory 118 may include one or more of optically readable storage media (e.g., optical discs, etc.), a magnetically readable storage medium (e.g., flash drive, etc.), and/or other electronically readable storage medium. The memory 118 may include one or more virtual storage resources (e.g., cloud storage, a virtual private network, and/or other virtual storage resources). The memory 118 may store software algorithms, information determined by the processor, and/or other information that enables components of a system 100A to function as described herein.

Optionally and preferably, memory 118 is configured for storing a defined native instruction set of codes. Processor 116 is configured to perform a defined set of basic operations in response to receiving a corresponding basic instruction selected from the defined native instruction set of codes stored in memory 118. For example and without limitation, memory 118 may store a first set of machine codes selected from the native instruction set for receiving information through server interface 114 and a second set of machine codes selected from the native instruction set for analyzing the information to select the dispute resolution process, for example by operating analysis engine 120. Analysis engine 120 may be operated as a rules based engine, an AI engine, a plurality of such engines or a combination thereof, as described in greater detail below.

FIG. 1B shows a system 100B, in which the server is not required. Instead, a local analysis engine 122 is operated by user computational device 102 to perform the procedure selection analysis as described above.

Optionally the systems of FIGS. 1A and 1B are combined, such that an analysis engine is present at both user computational device 102 and server 112 (not shown). Also optionally, the analysis engine may be implemented as a rules based engine, through a machine learning algorithm or with a neural net, or a combination thereof. Non-limiting examples of suitable algorithms include categorization classifiers; discriminant analysis (including but not limited to LDA (linear discriminant analysis), QDA (quadratic discriminant analysis) and variations thereof such as sQDA (time series quadratic discriminant analysis), and/or similar protocols); Riemannian geometry; any type of linear classifier; Naïve Bayes Classifier (including but not limited to Bayesian Network classifier); k-nearest neighbor classifier; RBF (radial basis function) classifier; neural network and/or machine learning classifiers including but not limited to Bagging classifier, SVM (support vector machine) classifier, NC (node classifier), NCS (neural classifier system), SCRLDA (Shrunken Centroid Regularized Linear Discriminate and Analysis), Random Forest; and/or some combination thereof. Suitable neural net models include but are not limited to comprise one or more of a CNN (convolutional neural network), RNN (recurrent neural network), DBN (deep belief network), and GAN (generalized adversarial network).

Figure 2:
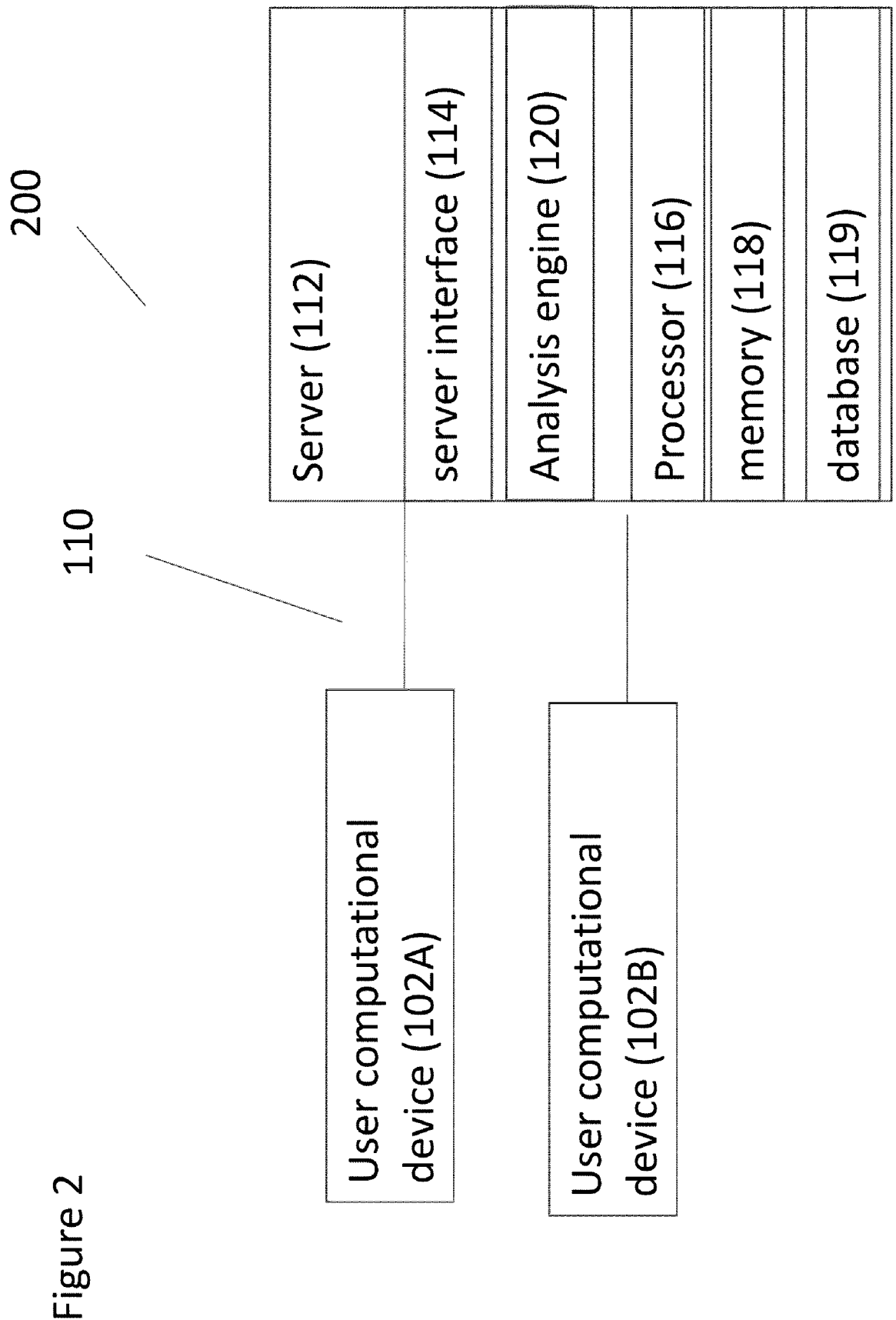
FIG. 2 shows a non-limiting, exemplary system for receiving input from a plurality of parties through separate computational devices, and then determining procedure selection analysis from the combined information.

FIG. 2 shows a non-limiting, exemplary system for receiving input from a plurality of parties through separate computational devices, and then determining procedure selection analysis from the combined information. In a system 200, a plurality of computational devices 102 are in communication with server 112. Two such computational devices 102 are shown, 102A and 102B, for the purpose of illustration only and without any intention of being limiting. Optionally each party enters information through a different computational device 102, for example through a website or other software interface. Optionally there are more than two parties in the dispute. System 112 receives the information and analysis engine 120 performs the analysis as previously described.

Optionally more participants in the process enter information through a user computational device 102, beyond the parties to the dispute, including but not limited to an agent, representative, advocate, lawyer, guardian and the like. Alternatively, one such participant may enter the information on behalf of both parties. For example and without limitation, a human resources representative for a company may enter the details for multiple parties in a company. As another non-limiting example, intake staff at a mediation center may enter such information on behalf of a plurality of parties and/or other participants.

FIG. 3 shows a non-limiting, exemplary flow for performing procedure selection analysis and selecting a procedure accordingly. In a method 300, the process starts with having the participants log in and/or register to the system in 302. The participants at least include the parties having the dispute, but may also include guardians, representatives, agents, lawyers and others who are involved with the parties, if not the dispute itself. One or more expert witnesses may also be a participant.

In 304, each participant answers factual questions about the case. Non-limiting examples of such factual questions include previous negotiations or offers made, communication/documents exchanged, expert advice or reports, basis of the dispute/legal cause of action, award sought, dates and types of proceedings commenced and any zone of possible agreement as perceived by either party. Each participant also enters personal information at this time and answers questions in relation to experience. Optionally such information includes general demographic data: age, race, gender, occupation, education; experience with disputes: involved in any of the dispute resolution processes before; when the current dispute started to assess number of days dispute already running; processes already undertaken e.g. documents filed or mediation performed; and where they have sought information e.g. family, friends, colleagues, unions, courts, lawyer.

Each participant then provides subjective information and impressions related to the case in 306. Optionally such information includes the level of knowledge and skill, and attitudes towards, resolving disputes. Preferably the goal(s) of the participant are also provided. Questions may be asked to determine emotional responses, as well as to determine whether each participant has a realistic understanding of the case and the issues at hand.

The personality type of each participant is determined at 308. It is known that certain personality types are more conducive toward reaching a settlement than others. Also certain procedures may be more effective with particular personality types. Furthermore, determining the personality type may also be useful in deciding whether additional preparation for a particular procedure, such as coaching, is necessary or even required before the procedure begins.

At 310, the case (that is, the dispute with the participants and facts) is optionally matched to a template. Template matching can be useful for procedure selection assessment, as cases meeting certain parameters may be best handled according to certain procedures. For example, a party who is seeking to establish a legal precedent will only have their needs met through litigation, whereas a party who seeks to maintain a relationship with the opposing party will be better served using mediation. Binding arbitration may be useful for parties who seek a definite resolution but want a more flexible process where specialists in the field can make enforceable determinations within a specified timeframe.. A party who is not yet in dispute may be best served by conflict coaching and education for self advocacy so that they can try and prevent a dispute from arising when negotiating an outcome with another party.

Procedure selection factors are then preferably determined for different procedures at 312, and preferably include goals and features. Goals are the goals of the parties. Features are contextual elements that impact, either positively or negatively, on the potential for resolution. Based upon these procedure selection factors, the type of procedure is selected at 314. Preferably these factors include goals and features, which may be considered against each other in a two dimensional graph or other plot that may be considered in sections. Each section may relate to a particular procedure or to a particular form of a particular procedure. If the goals of the parties and/or features of the dispute are not suitable for a particular procedure, or for a particular form of a particular procedure, then selecting that procedure, or that form of the procedure, would be expected to yield much less chance of resolution.

For example for mediation, factors and goals that could result in failure may occur because parties are very fixed and/or the context of the dispute is likely to inhibit resolution. This means that parties are going to be challenging, and they are the ones that are more likely to complain or be dissatisfied with the procedure itself or those providing the procedure. They potentially have less skills to resolve problems and may cause problems for the provider of the procedure, such as a mediator for example. In this instance, co-mediation might be recommended as it provides additional support for parties and reduces business risks for the mediator as they are not required to work alone with these difficult parties. On the other hand, factors and goals that could lead to success in mediation are parties that have more dispute resolution skills and so are less likely to cause problems for the business as they have the skills/mindset to negotiate or compromise.

Non-limiting examples of some subtypes of mediation that may be selected include the following. Some of these subtypes may be combined, such as for example combining facilitated negotiation with a high conflict personality process.

Facilitated Negotiation is a process in which the parties to a dispute, who have identified the issues to be negotiated, utilize the assistance of a dispute resolution practitioner (the facilitator), to negotiate the outcome. The facilitator has no advisory or determinative role on the content of the matters discussed or the outcome of the process, but may advise on or determine the process of facilitation.

Fast Track Mediation is a one hour process in which the parties to a dispute, with the assistance of a dispute resolution practitioner (the mediator), identify the issues in dispute, develop options, consider alternatives and endeavor to reach an agreement. The mediator may have an advisory role on the range processes available for resolution, the content of the dispute or the outcome of its resolution, but not a determinative role. The mediator may advise on or determine the process of mediation whereby resolution is attempted, and may make suggestions for terms of settlement, give expert advice on likely settlement terms, and may actively encourage the participants to reach an agreement.

High Conflict Personality Mediation is a process in which the dispute resolution practitioner draws on strategies and/or techniques developed for use with High Conflict Personalities e.g. E.A.R statements (empathy, attention and respect).

Neurodiversity Inclusive Mediation is a process in which the dispute resolution practitioner modifies the dispute resolution process in ways that meet the unique needs of neurodivergent individuals. This may include the practitioner drawing on strategies or techniques developed for use with individuals who are neurodiverse e.g. reduced focus on perspective-taking and emotional elements and greater focus on adhering to rules and logical solutions for parties on the Autism Spectrum.

Facilitative Mediation is a process in which the parties to a dispute, with the assistance of a dispute resolution practitioner (the mediator), identify the disputed issues, develop options, consider alternatives and endeavor to reach an agreement. The mediator has no advisory or determinative role in regard to the content of the dispute or the outcome of its resolution, but may advise on or determine the process of mediation whereby resolution is attempted. Mediation may be undertaken voluntarily, under a court order, or subject to an existing contractual agreement.

Co Mediation is a process in which the parties to a dispute, with the assistance of two dispute resolution practitioners (the mediators), identify the disputed issues, develop options, consider alternatives and endeavor to reach an agreement. The mediators adopt the behaviors which are consistent with the mediation model selected. For example, Fast Track Co Mediation will adopt the Fast Track Mediation process but will be conducted by two mediators, whereas Facilitative Co Mediation will be conducted by two mediators using a facilitative approach.

Shuttle Mediation, is a process in which the parties to a dispute, with the assistance of a dispute resolution practitioner (the mediator), identify the disputed issues, develop options, consider alternatives and endeavor to reach an agreement without being brought together. The mediator has no advisory or determinative role on the content of the dispute or the outcome of its resolution, but may advise on or determine the process of mediation whereby resolution is attempted. The mediator may move between parties who are located in different rooms, or meet different parties at different times for all or part of the process.

Shuttle Negotiation is a process in which the parties to a dispute, who have identified the issues to be negotiated, utilize the assistance of a dispute resolution practitioner (the facilitator), to negotiate the outcome without being brought together. The facilitator has no advisory or determinative role on the content of the matters discussed or the outcome of the process, but may advise on or determine the process of facilitation. The facilitator may move between parties who are located in different rooms, or meet different parties at different times for all or part of the process.

Facilitation is a process in which the parties (usually a group), with the assistance of a dispute resolution practitioner (the facilitator), identify problems to be solved, tasks to be accomplished or disputed issues to be resolved. Facilitation may conclude there, or it may continue to assist the parties to develop options, consider alternatives and endeavor to reach an agreement. The facilitator has no advisory or determinative role on the content of the matters discussed or the outcome of the process, but may advise on or determine the process of facilitation.

Multi-party Mediation is a mediation process which involves several parties or groups of parties.

The procedure requirements are then determined at 316. At 317, it is determined whether the procedure is available. If not, the procedure may return to 314, to consider a different type of procedure, or may instead result in a case being referred to a different firm of such procedure providers, if for example the process is being performed through software available through a particular firm. One non-limiting example may include a Facilitative Mediation focused firm referring a dispute to a Fast Track Mediation focused firm if it is determined that a dispute is best suited to Fast Track Mediation.

If the procedure is available, the requirements for the personnel needed to perform the selected procedure are then determined at 318. Non-limiting examples of such requirements include being trained in the particular ADR (alternative dispute resolution) modality, including being trained as a Conflict Coach, mediator, conciliator, arbitrator, and also plus expertise or experience in the subject matter. For high conflict parties, preferably the procedure provider is trained in High Conflict Practices. Each also needs capacity to manage certain personality types depending upon the personality of the parties, such as the dispute-savvy party who will want to have a lot of input into the process. In this case, the party may have a mindset that is conducive to reaching a resolution but will want to work with a practitioner who is skilled in maximizing opportunities for parties to maintain control.

Where parties sit at the other end of the personality type spectrum, the most suitable procedure provider is a practitioner who can manage parties with very fixed positions and/or who have unrealistic expectations. Such a practitioner is preferably capable of using influence and persuasion to guide parties through the process in a way that minimizes the emotional and financial burden on these typically inexperienced parties. In contrast, parties located in the middle of the dispute-savvy spectrum require a practitioner (procedure provider) who is preferably able to work with people who are seeking to compromise but may need guidance about the best way forward for their circumstances. Ideally, the practitioner can coach them to take more ownership of the resolution but parties may still be quite reliant on the practitioner.

At 320, it is determined whether such suitable personnel are available. If not, the procedure may return to 314, to consider a different type of procedure, or may instead result in a case being referred to a different firm of such procedure providers, if for example the process is being performed through software available through a particular firm.

If the personnel are available, then the schedule of the proceeding is determined at 322, according to the availability of the participants and the needs of the case. After the proceeding is finished, the results are preferably analyzed for feedback at 324.

FIG. 4 shows a non-limiting, exemplary process for procedure selection analysis according to at least some embodiments. As shown in a process 400, each personality is analyzed for relevant factors that would tend to either promote or inhibit reaching a settlement, and that would also potentially affect whether certain procedure(s) are more likely to be successful 402. One or more personality factors may then be flagged at 404. Stages 402 and 404 are described in more detail, in a non-limiting example, with regard to FIG. 7. As a result of flagging one more personality factors, one or more procedures may be eliminated from further consideration at 406. Alternatively, and optionally also for each mention of eliminating one or more procedures, this stage is performed after more or all factors have been considered.

Next, the case is analyzed for relevant factors at 408. These factors may include for example the goals of the participants, as well as the time period that has elapsed since the dispute started. Non-limiting examples of such goals are given below. This stage and remaining stages for analysis of factors are described in more detail, in a non-limiting example, with regard to FIG. 8.

TABLE 1

| Non-limiting continuum of Party Goals | |
|---|---|
| Goals | Vertical axis |
| Information about standards and/or processes/options | There is no current dispute: The caller would like some ideas on options for resolving disputes or DRservices. They would also like to know general information, objective standards, typical processes in relation to a particular issue e.g. typical expectations for communication and cost sharing for new neighbors who will need to erect a common fence? |
| Conflict Coaching and / or reality testing | There is no current dispute: The caller would like some ideas on how to prevent or deescalate potential conflict or they want to check if the ideas that they have about preventing or deescalating conflict are sensible or good practice |
| Information about standards and/or processes/options | There is a current dispute: The caller would like some ideas on options for resolving their current dispute including information about DR services. They would also like to know targeted information, objective standards, typical processes in relation to their current dispute e.g. What can you do if you want to erect a new fence and the neighbor won't respond to your attempts to contact them? When is it reasonable to replace a fence? |
| Conflict Coaching and / or reality testing | There is a current dispute: The caller would like some ideas on options for resolving their current dispute including information about DR services. They would also like to talk through options for communicating with the other party (OP). They may also want to test the kinds of things that they may say or write to OP or ideas for resolving the dispute. |
| Maintain/improve relationship | There is a current dispute. The party has requested that the service provider help to resolve the dispute. It is important to the party that they do what they can to maintain or repair the relationship between the parties. |
| Take problem solving approach/find new solutions | There is a current dispute. The party has requested that the service provider help to resolve the dispute. The party is taking a problem solving approach to the dispute and is open to considering a range of options in an attempt to find an optimal outcome for all parties |
| Control outcome - avoid imposed decision | There is a current dispute. The party has requested that the service provider help to resolve the dispute. The party is keen to maintain control of the outcome and want to avoid having a decision or determination imposed on them by a third party neutral (TPN) (Court or Tribunal) |
| Control process - draw from a range of ADR models | There is a current dispute. The party has requested that the service provider help to resolve the dispute. The party is keen to maintain control of the process and want to be involved in designing/selecting a combination of options that are suited to their particular dispute. E.g. They might want to mediate part of their dispute and have another part of the dispute decided by an expert or other TPN. |
| Come to a compromise (both give up something) | There is a current dispute. The party has requested that the service provider help to resolve the dispute. The party want to come to a compromise. They are open to ideas such 50/50. Their expectation is they everyone will need to give things up and that both parties may walk away only partially satisfied. |
| Resource minimization (cost, time or energy) | There is a current dispute. The party has requested that the service provider help to resolve the dispute. The party has asked this in an attempt to minimise the cost, time or energy required to resolve the dispute. They are likely to want to avoid time/energy and costs associated litigation or arbitration. |
| Maintain privacy/confidentiality | There is a current dispute. The party has requested that the service provider help to resolve the dispute. It is important to the party that they do what they can to maintain privacy or repair the confidentiality between the parties. |

TABLE 1-continued

| Non-limiting continuum of Party Goals | |
|---|---|
| Goals | Vertical axis |
| Court/tribunal annexed and/or compulsory dispute resolution | There is a current dispute. The party has been sent to mandatory DR by a court tribunal. Alternatively, the parties may be compelled to participate through legislation or contractual agreement. The party's motivation is based on compliance. |
| Maintain position/convince the other side to do or not do something | There is a current dispute. The party has requested that the service provider help to resolve the dispute. The party's goal is to maintain or improve their position and they are unwilling to compromise. The primary motivation is to use the time to convince the OP of the strength or rightness of their claim. |
| Neutral opinion about facts and/or outcome | There is a current dispute. The party wants help to resolve the dispute. They TPN makes an assessment of their claim to provide an evaluation of its strength. Alternatively they may want a TPN to consider the entirety of the dispute and make an evaluation of facts and/opt likely outcomes. These evaluations can then form the basis of an agreement between the parties. |
| Shift Res for Decision to TPN - seeks a determination | There is a current dispute. The goal of the party is to have a TPN make a decision or determination. |
| Judicial outcomes (e.g. precedent, injunction, public vindication etc. | There is a current dispute. The goal of the party is to establish a precedent, obtain an injunction or have the outcome of their case on the public record. |
| Wholly frivolous claim | The party claims that there is a current dispute. The basis of the claim is without merit and nothing is to be gained by bringing the parties together to attempt to resolve the alleged dispute. E.g. Accusation that a neighbor has put a curse on the cat. |

As a result of obtaining these relevant factors, optionally one or more procedures may be eliminated from further consideration at 410.

Inhibitory and facilitating factors, in both the case and the participants, are then preferably determined at 412. If not previously determined, the goals of the participants are determined at 414. If previously determined, they may be reconsidered or reanalyzed in light of further information provided.

Next contextual factors for reaching the goals are determined at 416. Non-limiting examples of such contextual factors are given in the table below.

TABLE 2

| Non-limiting continuum of Contextual Factors | |
|---|---|
| Factors | Horizontal axis |
| Realistic expectations | The party has realistic expectations about what can be achieved in mediation or other dispute resolution process. They understand that they parties may never agree on the facts and/or that they may need to be flexible or open minded when discussing possible options for resolution. |
| Can identify BATNA and WATNA (what's at stake if no agreement reached) | The party understands the idea that they must consider the alternatives to a negotiated agreement so that they can properly assess when it is better to walk away. They can identify both their Best Alternative to a Negotiated Agreement (BATNA) and their Worst Alternative to a Negotiated Agreement (WATNA). They may even be able to identify the BATNA and WATNA for the other party. |
| Trade-offs possible (e. g. transactional or multiple issues in case) | The dispute involves multiple issues or the potential for trade offs. This enables parties to give and take according to areas that are most important to them. Single issue matters can be harder to resolve as there is less room for give and take. |
| No ongoing relationship | The parties will not be involved in any ongoing relationship and |
| Moderate to high uncertainty of | The party is not sure about their prospects of 'winning'. This uncertainty motivates them to |

TABLE 2-continued

| Factors | Horizontal axis |
|---|---|
| winning at court. | resolve the dispute themselves rather than risk an unfavorable determination. |
| Proximity or difficulty finding shared time | The party is unable to reasonably attend a face-to-face session based on geographic distance or inability to find a suitable common time. Parties may also express interest in engaging in a virtual or online dispute resolution process. |
| Time pressure | Timeliness in an important feature of the dispute. E.g. their in an impending event or deadline that requires the dispute to be resolved promptly or within a specific timeframe e.g. burial dispute, illness, court date. |
| Referred by external body or agency | An organization or external body has referred the dispute to the service provider for resolution. E.g. Body Corporate has referred disputing tenants; or Sporting Club has referred 2 Directors |
| Linkage to other disputes | The dispute is linked to other disputes. This may be one of a series of disputes about the same issue or it may be different issues involving the same parties. |
| Need to express emotions or be heard | There is a significant emotional component to the dispute and it is important to one or both of the parties that they have the opportunity to tell their story, have the experience of being heard. |
| Requires aids (communication or physical e.g. interpreter/ auslan) | One or both of the parties requires assistance of an independent person or assistive technology in order to participate in the dispute resolution process. |
| Difficulty identifying who has authority, | It is difficult or impossible to determine the parties who have authority to participate in the dispute resolution process and/or come to an agreement |
| Group/multiple parties | The dispute involves a group or multiple parties. The group and/or parties all need the opportunity to be involved in the dispute resolution process including the development of an agreement to resolve the dispute. |
| Poor Communication | There is a history between the parties of poor communication (actual or perceived) |
| Forced proximity or relationship (neighbors or members of group) | The parties are forced into a relationship by virtue of proximity or membership to a common group. It is not possible for them to cease all current and future communication/contact even if they wanted to. |
| Different view of the issues, facts or rights | The parties have different perceptions of the issues in dispute, the facts of the dispute or their rights in relation to the dispute. These perceptions may be based on personal interpretations or information/advice obtained from a third party e.g. lawyer, legislation, website. The may lack the understanding that this is a common feature of disputes and that parties may never come to an agreement on the 'truth'. |
| Constituent pressure | One or both of the parties is facing pressure from a cultural, familiar or societal group or will have to account for any negotiated agreement to that group. This means that they may run the risk of 'losing face' or standing if they come to an agreement that is not consistent with constituent expectations. |
| Power imbalance | There is a power imbalance (actual or perceived) between the parties. The greater the power imbalance the less chance there is for a negotiated outcome. |
| Important principle at stake | The issue/s in dispute are a matter of principle. Typically it will involve a breach (actual or perceived) of a moral, social, cultural or group rule/norm. |
| Fear of disclosure (negotiators dilemma) | One or both parties may be concerned that if they reveal certain information this may reduce their negotiating power. The withholding of such information may impact on the potential to find workable solutions. |
| Psychological barriers/mental health issues/neurodiversity | One or both parties have psychological, mental health issues or neurodiversity that prevent them from communicating or negotiating with the other party in a manner that is conducive to resolving the dispute. E.g. A person may be severely depressed or suffering from extreme stress such that it impairs their capacity to problem solve or make decisions. |
| Inability/ unwillingness to understand expectations of other party | One or both parties are experiencing shock, surprise or bereavement. E.g. there may be a recent death, or the dispute was unexpected. Parties may not have had time to think about the dispute and strategies that they may take to resolve it constructively. Emotions are likely to be heightened. |
| Ongoing unrealistic expectations | Despite being provided with information about the process and possible outcomes, the party continues to have unrealistic expectations about the dispute resolution process or the behavior of the other party. E.g. the party believes that they will get all that they are asking for and will not have to give anything in return or propose possible solutions. |
| Shock, surprise or bereavement | The dispute was unexpected or has occurred in the context of a shock, trauma or bereavement. The parties may be in a high state of emotion, or flight/flight and may have trouble with problem solving or reasoning because of this. |
| Family members or intimate relationships | The parties are family or partners. This means that issues not in dispute may impact on the way that parties negotiate or the agreements they make. To this extent parties, bring their 'history with them' to the dispute. |
| Conflicting religious, cultural or intergenerational norms/values | One or both parties are unwilling or unable to consider the dispute from the perspective of the other party. They are only interested in their own expectations in relation to the issues in dispute. |
| Deep seated contempt or distrust | One or both parties do not respect or like each other. They believe that even if they come to an agreement the other party is unlikely to stick to the agreement as they are not trustworthy. |
| Inability to negotiate effectively (volatile or aggressive communication style) HCP | The party is volatile or has an aggressive communication style such that it interferes with the dispute resolution process. E.g. The party uses threats or intimidation as their primary means of negotiation. |
| Safety concerns or intervention orders permitting mediation | One or both parties are fearful of each other and have concerns for their safety. Alternatively, there are intervention orders in place, but they permit mediation. |
| Family Violence, including intervention order which allows for mediation. | There is a history of family violence or a Family Violence intervention order in place which allows for mediation. The dispute resolution process must not be used for the purpose of dealing with or resolving the family violence issues. E.g. a civil claim referred by the Magistrate's Court but where parties are involved in a concurrent and separate dispute related to family violence. |

Tables 1 and 2 shown above provide non-limiting examples of the goals and contextual factors that academics and practitioners have identified as playing an important role in resolving disputes. Each table is organized to according to psychometric principles such that they provide a continuum from most likely to assist resolution to least likely to assist resolution.

Next the case, the personalities, the goals and the contextual factors are matched to each procedure to determine the procedure selection factors at 418. Optionally, the goals and contextual features for each party are located along each of the continua and that this information is combined to determine the procedure most likely to lead to resolution. One non-limiting example includes where parties' goals and the context are not conducive with finding a resolution, for example, both are looking to set a precedent and there has been a history of violence. Where this combination exists, the program may determine that consensual dispute resolution procedures are not suitable and the preferred or recommended procedure for reaching resolution is litigation. On the other hand, if parties are keen to take a problem solving approach and they also have scope to apologize, it may be that a facilitated negotiation is the most effective and efficient procedure for resolving the dispute.

FIGS. 5A and 5B relate to non-limiting, exemplary implementations of neural net models for assessing the procedure selection factors according to at least some embodiments. Turning now to FIG. 5A as shown in a system 500, text inputs are preferably provided at 502 and preferably are also analyzed with the tokenizer in 518. A tokenizer is able to break down the text inputs into parts of speech. The text inputs may be in the form of a document for example. By "document", it is meant any text featuring a plurality of words.

Various methods are known in the art for tokenization. For example and without limitation, a method for tokenization is described in Laboreiro, G. et al (2010, Tokenizing micro-blogging messages using a text classification approach, in 'Proceedings of the fourth workshop on Analytics for noisy unstructured text data', ACM, pp. 81–88).

Once the document has been broken down into tokens, optionally less relevant or noisy data is removed, for example to remove punctuation and stop words. A non-limiting method to remove such noise from tokenized text data is described in Heidarian (205, Multi-clustering users in twitter dataset, in 'International Conference on Software Technology and Engineering, 3rd (ICSTE 205)', ASME Press). Stemming may also be applied to the tokenized material, to further reduce the dimensionality of the document, as described for example in Porter (1980, 'An algorithm for suffix stripping', Program: electronic library and information systems 14(3), 130-137).

The tokens may then be fed to an algorithm for natural language processing (NLP) as described in greater detail below. The tokens may be analyzed for parts of speech and/or for other features which can assist in analysis and interpretation of the meaning of the tokens, as is known in the art.

Alternatively or additionally, the tokens may be sorted into vectors. One method for assembling such vectors is through the Vector Space Model (VSM). Various vector libraries may be used to support various types of vector assembly methods, for example according to OpenGL. The VSM method results in a set of vectors on which addition and scalar multiplication can be applied, as described by Salton & Buckley (1988, 'Term-weighting approaches in automatic text retrieval', Information processing & management 24(5), 513-523).

To overcome a bias that may occur with longer documents, in which terms may appear with greater frequency due to length of the document rather than due to relevance, optionally the vectors are adjusted according to document length. Various non-limiting methods for adjusting the vectors may be applied, such as various types of normalizations, including but not limited to Euclidean normalization (Das et al., 2009, 'Anonymizing edge-weighted social network graphs', Computer Science, UC Santa Barbara, Tech. Rep. CS-2009-03); or the TF-IDF Ranking algorithm (Wu et al, 2010, Automatic generation of personalized annotation tags for twitter users, in 'Human Language Technologies: The 2010 Annual Conference of the North American Chapter of the Association for Computational Linguistics', Association for Computational Linguistics, pp. 689-692).

One non-limiting example of a specialized NLP algorithm is word2vec, which produces vectors of words from text, known as word embeddings. Word2vec has a disadvantage in that transfer learning is not operative for this algorithm. Rather, the algorithm needs to be trained specifically on the lexicon (group of vocabulary words) that will be needed to analyze the documents.

This tokenizer information is then fed into an AI engine in 506 and information quality output is provided by the AI engine in 504. In this non-limiting example, AI engine 506 comprises a DBN (deep belief network) 508. DBN 508 features input neurons 510 and neural network 514 and then outputs 512.

A DBN is a type of neural network composed of multiple layers of latent variables ("hidden units"), with connections between the layers but not between units within each layer.

The outputs 512 may include for example an analysis of the goals of the parties along a continuum, rather than as a set of rules. The outputs 512 may also include an analysis of the contextual factors that are relevant to the parties. Both such analyses may be combined to a single analysis that results in the selection of a particular procedure or of a particular type of procedure. Preferably, mediation may be considered where suitable, followed by conciliation, binding arbitration and then by litigation, where no suitable procedure can be selected.

FIG. 5B relates to a non-limiting exemplary system 550 with similar or the same components as FIG. 5A, except for the neural network model. In this case, a neural network 562 includes convolutional layers 564, neural network 562, and outputs 512. This particular model is embodied in a CNN (convolutional neural network) 558, which is a different model than that shown in FIG. 5A.

A CNN is a type of neural network that features additional separate convolutional layers for feature extraction, in addition to the neural network layers for classification/identification. Overall, the layers are organized in 3 dimensions: width, height, and depth. Further, the neurons in one layer do not connect to all the neurons in the next layer but only to a small region of it. Lastly, the final output will be reduced to a single vector of probability scores, organized along the depth dimension. It is often used for audio and image data analysis, but has recently been also used for natural language processing (NLP; see for example Yin et al, Comparative Study of CNN and RNN for Natural Language Processing, arXiv:1702.011123v1 [cs.CL] 7 Feb. 2017).

FIG. 6 relates to a non-limiting, exemplary method for training a neural net or machine learning algorithm for selecting a dispute resolution process according to a plurality of factors.

As shown with regard through flow 600, the training data is received in 602. Preferably data is collected from a plurality of different situations involving disputes and the type of resolution involved, including but not limited to, the types of modalities used (that is, the type of dispute resolution processed used) and the outcome of the processes. Preferably the outcomes are analyzed according to whether potential modalities are matched to client needs, the effect of complexity on settlement rates, actual settlement rates, whether the outcome could be predicted and so forth.

Preferably the data is labeled, for example manually, or alternatively automatically (for example through a NLP type of algorithm). The training data may also be manually reviewed and cleaned.

The training data is then processed through the convolutional layer of the network in 604. For example, if a convolutional neural net is used, which is the assumption for this non-limiting example, then the training data would be passed through the convolutional layer. After that the data is processed through the connected layer in 606 and adjusted according to a gradient in 608. Typically, a steep descent gradient is used in which the error is minimized by looking for a gradient. One advantage of this is it helps to avoid local minima. A local minimum occurs when the AI engine (that is, neural net or machine learning algorithm) has been trained to the point of reaching a local, but not a true, minimum. The final weights are then determined in 610 after which the model is ready to use.

FIG. 7 shows a non-limiting, exemplary method for analyzing personal factors of the involved parties for assisting the selection of a dispute resolution process according to a plurality of factors. As shown in a method 700, each personality is analyzed according to a plurality of factors at 702. Next, relevant personality factors are placed on a plurality of continua at 704. The personality factor continua are then compared for the parties at 706. Warning factors for the personality of the parties are flagged at 708. These warning factors are then placed on a plurality of continua at 710. The continua for the personality and warning factors are then compared for the parties at 712.

The parties' contextual factors are then determined at 714. These contextual factors may include but are not limited to ethnic culture, religious culture, national culture and others. Other non-limiting examples include whether the parties belong to a particular community, which may relate to a community engaged in a certain activity, such as theater, the arts, a local political group and so forth; a physical community (village, town or city); a distributed or virtual community (an open source software group, a non-local political group, for example for climate change, and the like); an organization (which may be charitable, academic, a trade group or another such organization); or a company. Optionally a further stage is performed to determine the nature of that community in terms of dispute resolution. For example, this stage may include determining whether the community prefers consensual dispute resolution or tends to approach disputes more antagonistically. Other aspects that may be included relate to whether a particular community feels, or members within that community feel, that they need to assist in conflict resolution, or alternatively whether the community/members feel that conflict resolution is best left to the parties themselves.

Other contextual factors that may be considered relate to reputational risk, for example whether the parties are more likely to view an antagonistic or court-based resolution as a risk to their reputation. The reputational risk may also be assessed with regard to the above cultural and community based analyses.

A plurality of continua for these contextual factors are then determined at 716. The continua for personality, warning factor and contextual factors are then compared and optionally collectively analyzed at 718, to combine them to an output. These combined factors are preferably then fed to a process for application to the overall factor analysis at 720.

FIG. 8 shows a non-limiting, exemplary method for analyzing case related factors of the involved parties for assisting the selection of a dispute resolution process according to a plurality of factors. As shown in a process 800, the process begins at 802, when the objective case is analyzed for relevant factors. At 804, the relevant factors are placed on a plurality of continua. Each party's view of the case is then analyzed for relevant factors at 806. The objective and subjective continua are compared at 808, in which the objective continua are obtained from the objective factors of the case, and the subjective continua are obtained from each party's view of the case.

Inhibitory and facilitating case factors are then determined at 810. The inhibitory and facilitating factors are placed on continua at 812. Continua are compared for all case factors at 814. The parties' goals are determined at 816. Next, these goals are placed on continua at 818. The case factor and goal continua are compared at 820, and are then preferably combined to an output. This output is then preferably applied to the overall factor analysis at 822.

Considering the inputs from FIGS. 8 and 9 together, Tables 1 and 2 shown above provide non-limiting examples of the goals and contextual factors that may be incorporated.

Optionally, to ensure the ongoing reliability and validity of any continua utilized for determining dispute resolution procedures, the program may, either manually or automatically, review the content and/or sequencing of each continuum used in the determination of dispute resolution procedure. For example, and without limitation, a method for analyzing and reviewing continua is described in Andrich, D. (1978). A Rating Formulation for Ordered Response Categories. Psychometrika, 43, 561-73; Masters, G. (1998). Standards and Assessment for Students and Teachers: A Developmental Paradigm. Seminar Series Paper, 74, IARTV; and Adams, R., & Khoo, S.T. (1996). Quest. Melbourne, Australia: Australian Council for Educational Research. One non-limiting example includes conducting a multi-variate analysis using previously captured data to reveal that, for example, within a certain sector constituent pressure has a greater inhibiting effect than the existence of high conflict personality traits. On this basis the program would draw on the modified continua for disputes within that specific sector.

Optionally for each analysis of a set of continua as described above, and/or for combining analyses of a plurality of sets of continua, an AI engine or algorithm is trained as described above with regard to FIGS. 5 and 6. Optionally, a rules based engine is used for each analysis of a set of continua as described above, and/or for combining analyses of a plurality of sets of continua. The rules based engine would receive the factors and their relative weighting, and/ or would weight one or more factors or groups of factors. The rules based engine would then analyze the set(s) of continua according to the weighting and also according to one or more rules. Optionally, the rules based engine would reconsider the weighting after an output was received, for example if a plurality of rules were invoked. Combinations of AI engines or algorithms and rule based engines may also be used. Non-limiting examples of such AI engines or algorithms and rule based engines are described below with regard to FIGS. 9 and 10.

FIG. 9 shows a non-limiting, exemplary method for selecting a dispute resolution process according to a plurality of factors, through a rules based engine. As shown in a process 900, the process begins with receiving personality, warning factor and contextual continua at 902, for example from the process as described in FIG. 7. Optionally these continua are received as separate continua for each category of personality, warning factor and contextual continua, as separate sets of continua for each category of personality, warning factor and contextual continua, or as partially or fully combined continua or sets of continua for each category of personality, warning factor and contextual continua.

Similarly, at 904, case and goal continua are received, for example from the process as described in FIG. 8. Again, optionally these continua are received as separate continua for each category of case and goal continua, as separate sets of continua for each category of case and goal continua, or as partially or fully combined continua or sets of continua for each category of case and goal continua.

At 906, weights are applied to these continua. These weights may be applied as described with regard to Tables 1 and 2 above, for example as the tables are continua and therefore a series of ordered variables, each variable can be understood as self-weighted by virtue of its position along the continua. As such, one non-limiting option for allocating rule-based weights for each variable is to assign the number of points corresponding to the variable's position on the continua. For example, the first variable on Table 1 is 'Information about standards and/or processes/options' and as such would receive a weighting of 1 point, whereas the variable 'wholly frivolous claim' is the 17$^{th}$ variable and as such would receive 17 points. At 908, the continua are analyzed according to these weights, which help to determine which procedure(s) may be most usefully selected. Optionally at 910, one or more additional rules are applied, for example if the result of 908 does not provide a single best procedure or single best plurality of procedures.

At 912, one or more procedures are selected. Procedure availability is then determined in 914, for example according to available resources such as trained personnel. If one or more procedures are not available, then optionally at 916 the process returns to stage 906 to determine again one or more procedures. Optionally this is repeated at 918 until at least one available procedure is selected.

FIG. 10 shows a non-limiting, exemplary method for selecting a dispute resolution process according to a plurality of factors, through an AI based engine, or preferably and as described in this illustrative method, a plurality of such engines or algorithms. The word "AI engine" is used collectively to refer to both AI engines, including without limitation neural nets and AI models, and also AI algorithms.

As shown in a process 1000, the process begins with receiving personality, warning factor and contextual continua at 1002, for example from the process as described in FIG. 7. Optionally, and as described for FIG. 9, these continua are received as separate continua for each category of personality, warning factor and contextual continua, as separate sets of continua for each category of personality, warning factor and contextual continua, or as partially or fully combined continua or sets of continua for each category of personality, warning factor and contextual continua.

Similarly, at 1004, case and goal continua are received, for example from the process as described in FIG. 8. Again, optionally these continua are received as separate continua for each category of case and goal continua, as separate sets of continua for each category of case and goal continua, or as partially or fully combined continua or sets of continua for each category of case and goal continua.

At 1006, each set of continua is preferably analyzed separately according to an AI engine. For example, preferably each set of continua in each category of personality, warning factor, contextual, case and goal continua is analyzed separately. Optionally a plurality or all sets of continua in each category is analyzed separately, by an AI engine. The AI engine is preferably trained separately on each set and/or category.

At 1008, groups of sets of continua are optionally and preferably analyzed by an AI engine. The grouping may be determined heuristically or according to ensemble learning, in which output of a plurality of different AI engines is combined according to a deterministic and/or AI engine based method, to determine the most suitable outcome. At 1010, the output of a plurality and optionally all AI engines is combined.

At 1012, a procedure is selected according to the combined output. Optionally a plurality of such procedures is selected. Procedure availability is then determined in 1014, for example according to available resources such as trained personnel. If one or more procedures are not available, then optionally at 1016 the process returns to stage 1006 to determine again one or more procedures. Optionally this is repeated at 1018 until at least one available procedure is selected.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for selecting a dispute resolution procedure, comprising a user computational device, a computer network and a server, wherein said user computational device communicates with said server through said computer network, said user computational device comprising a first processor and a first memory, said first memory comprising a plurality of instructions, said plurality of instructions being executed by said first processor for providing a user interface, wherein said user interface receives at least one goal of each party in the dispute and at least one characteristic of the dispute, said server comprising a second processor and a second memory, said second memory comprising a plurality of instructions being executed by said second processor for providing an analysis engine, and wherein said analysis engine compares said at least one goal and said at least one characteristic to select the dispute resolution procedure; wherein said analysis engine further comprises a rules based engine for analyzing a plurality of factors and for assigning weights to said factors, such that the dispute resolution procedure is selected according to said weights, wherein said plurality of factors comprises personality factors of each party, said at least one goal of each party and said at least one characteristic of the dispute; wherein said rules based engine further analyzes each of said plurality of factors separately and places each of said plurality of factors on each of a plurality of continua, wherein said weights are applied to said continua; and wherein said factors further comprise subjective perceptions of the parties regarding the dispute and contextual factors regarding the environment of the parties; wherein said rules are selected to enable selecting a procedure according to one or more of psychological status, neurodiversity, cultural assumptions, religious assumptions, or a combination thereof.

2. The system of claim 1, wherein said user computational device receives a plurality of factual information and a plurality of subjective impressions about the dispute, and wherein said analysis engine compares said factual information and said subjective impressions to a plurality of templates, said analysis engine selecting a template and said analysis engine selecting the dispute resolution procedure according to said template.

3. The system of claim 1, wherein said user computational device comprises a plurality of user computational devices.

4. The system of claim 1, wherein the dispute resolution procedure is selected from the group consisting of assisted negotiation, neutral evaluation, facilitation, arbitration, mediation, conciliation and litigation.

5. The system of claim 4, wherein the dispute resolution procedure further comprises a staged or stepped dispute management systems either between or within organizations.

6. The system of claim 1, wherein said analysis engine further comprises an AI engine for analyzing a plurality of factors and for selecting the dispute resolution procedure according to said plurality of factors, wherein said plurality of factors comprises personality factors of each party, said at least one goal of each party and said at least one characteristic of the dispute.

7. The system of claim 6, wherein said AI engine comprises a plurality of AI engines, wherein each AI engine further analyzes each of said plurality of factors separately and places each of said plurality of factors on each of a plurality of continua, and wherein an overall deciding AI engine receives output from each of said plurality of AI engines regarding each of said plurality of continue, such that said overall deciding AI engine selects the dispute resolution procedure according to an analysis of said plurality of continua.

8. The system of claim 6, wherein said analysis engine further comprises a rules based engine, wherein at least one continuum is determined according to said rules based engine, including application of said weight, and wherein at least one continuum is determined according to said AI engine, such that the dispute resolution procedure is selected according to a combination of said rules based engine and said AI engine output.

9. The system of claim 1, wherein the first memory is configured for storing a defined native instruction set of codes and the first processor is configured to perform a defined set of basic operations in response to receiving a corresponding basic instruction selected from the defined native instruction set of codes stored in the first memory, wherein the first memory stores a first set of machine codes selected from the native instruction set for receiving information from the user through the user interface and a second set of machine codes selected from the native instruction set for transmitting such information to the server, as information about the dispute and/or about the parties.

10. The system of claim 9, wherein said information about the dispute and/or about the parties comprises one or more of one or more personality factors and/or contextual (environmental) factors about the parties, one or more objective factors about the dispute and/or one or more subjective factors about the dispute as viewed by one or more parties.

11. The system of claim 9, wherein the second memory is configured for storing a defined native instruction set of codes and the second processor is configured to perform a defined set of basic operations in response to receiving a corresponding basic instruction selected from the defined native instruction set of codes stored in the first memory, wherein the second memory stores a first set of machine codes selected from the native instruction set for analyzing received information from the user computational device, received through the server interface; and a second set of machine codes selected from the native instruction set for selecting a dispute resolution process according to said analyzed received information.

* * * * *